No. 667,400. Patented Feb. 5, 1901.
A. S. MOORE.
VEHICLE WHEEL.
(Application filed Sept. 11, 1900.)
(No Model.)

WITNESSES:
W. De Sosa
F. M. Bill

INVENTOR.
Alfred S. Moore
BY
Bruce Cornwall
ATTORNEY.

THE NORRIS PETERS CO., PHOTO-LITHO., WASHINGTON, D. C.

UNITED STATES PATENT OFFICE.

ALFRED S. MOORE, OF GALT, CALIFORNIA.

VEHICLE-WHEEL.

SPECIFICATION forming part of Letters Patent No. 667,400, dated February 5, 1901.

Application filed September 11, 1900. Serial No. 29,697. (No model.)

*To all whom it may concern:*

Be it known that I, ALFRED S. MOORE, a citizen of the United States, residing at Galt, in the county of Sacramento and State of California, have invented certain new and useful Improvements in Vehicle-Wheels, of which the following is a specification.

My invention relates to improvements in vehicle-wheels, the object of my invention being to provide a vehicle-wheel which will take up or deaden the jar and vibrations experienced in traveling over rough roads in vehicles equipped with the usual form of wheels.

My invention therefore resides in the novel construction, combination, and arrangement of parts for the above ends hereinafter fully specified, and particularly pointed out in the claim.

Figure 1:
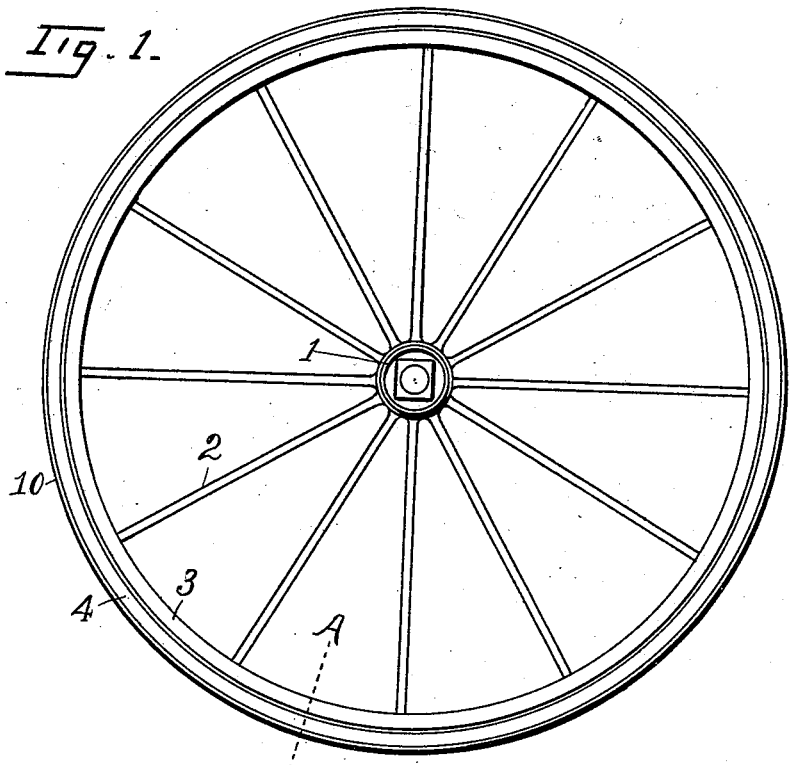
Figure 2:
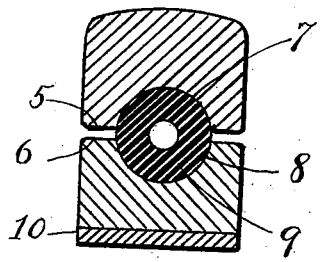

In the accompanying drawings, Figure 1 is a side elevation of a wheel constructed in accordance with my improvement, and Fig. 2 is a cross-section on the line A A of Fig. 1.

Referring to the drawings, 1 represents the hub of a wheel, and 2 the spokes thereof. The rim is formed in two annular sections, an inner section 3 and an outer section 4. The faces 5 6 of said sections, which are adjacent to each other, are recessed annularly, as shown at 7 8, and in said annular recesses is inserted a ring 9, of rubber. Said ring is preferably made hollow or tubular, as shown, so as to be more compressible and elastic than would be a solid ring. Upon the outside of the outer rim-section 4 is secured the metal tire 10.

I have found that this construction greatly reduces the jar and vibration, while at the same time it is very durable, the surface wear being only on the iron tire.

I claim—

A vehicle-wheel having a metallic tire, a wooden rim formed of inner and outer sections separated from each other, each rim having an annular recess substantially semicircular in cross-section, said recesses facing each other, and a hollow ring of rubber in said recesses, said ring being circular in cross-section, the parts being of such size and arrangement that the rubber ring acts as a lock to prevent lateral movement of the outer section relatively to the inner section, substantially as described.

In witness whereof I have hereunto set my hand in the presence of two subscribing witnesses.

ALFRED S. MOORE.

Witnesses:
A. F. DONALDSON,
ANDREW BOSS.